United States Patent [19]

Scheneman, Jr. et al.

[11] 4,286,441
[45] Sep. 1, 1981

[54] AUTOMATIC SLIP COUPLING ASSEMBLY

[76] Inventors: Herbert T. Scheneman, Jr., 11333 Oregon Cir.; Karl F. Maggio, 2200 Grove Park Rd., both of Fenton, Mich. 48430

[21] Appl. No.: 71,969

[22] Filed: Sep. 4, 1979

[51] Int. Cl.³ .............................................. F16D 7/02
[52] U.S. Cl. ................................. 64/30 C; 64/30 E; 64/29; 192/56 R; 198/781
[58] Field of Search ............ 64/29, 28 R, 30 R, 30 D, 64/30 E, 30 C; 192/56 R; 198/781

[56] References Cited

U.S. PATENT DOCUMENTS

| | | | |
|---|---|---|---|
| 2,727,372 | 12/1955 | Haerther | 64/30 C |
| 2,806,366 | 9/1957 | Woestemeyer | 64/28 R |
| 2,969,132 | 1/1961 | Stewart | 64/29 |
| 3,105,371 | 10/1963 | Forrest | 64/30 C |
| 3,185,275 | 5/1965 | Orwin | 64/29 |
| 3,376,714 | 4/1968 | Manoni | 64/30 R |
| 3,429,407 | 2/1969 | Orwin et al. | 64/29 |
| 3,457,733 | 7/1969 | Bangerter et al. | 64/30 R |
| 3,605,443 | 9/1971 | Redelman | 64/30 R |

*Primary Examiner*—Charles J. Myhre
*Assistant Examiner*—Magdalen Moy
*Attorney, Agent, or Firm*—Cullen, Sloman, Cantor, Grauer, Scott & Rutherford

[57] ABSTRACT

An automatic slip coupling assembly is disclosed for driving a conveyor roller from a power drive and which automatically disengages the conveyor roller from the power drive when a jam-up or blockage occurs of the parts being transported by the conveyor. The coupling assembly is operable when being driven either clockwise or counter-clockwise, and it is adjustable for varying loads and operating conditions. In a preferred embodiment, the automatic slip coupling assembly includes a plurality of radially spaced apart ball rollers which are rotatably secured in a retainer ring and which are sandwiched between a pair of resilient donut-shaped rings. One of the resilient rings is mounted to a sprocket, and the other resilient ring is mounted to a clutch plate. The entire coupling assembly is mounted onto the end of a shaft extending from the conveyor roller. The powered rotative movement to the sprocket is transmitted through the resilient donut-like rings and ball rollers to the clutch plate which is fixed to and drives the conveyor roll. If a jam-up occurs, the sprocket unit continues to rotate and slip occurs between the ball rollers and the clutch plate resilient ring thereby preventing damage to the parts on the conveyor system or to the conveyor system itself. In another form of the coupling assembly, the sprocket includes an annular groove or cam race and the clutch plate includes a channel for holding an O-ring resilient tube. In still another form of the coupling assembly, the sprocket and clutch plate include hardened metal cam details or races. Another aspect of the present invention resides in a roller mounting device which provides a quick attachment of the roller onto its rotative shaft and also provides absorption of potentially damaging blows received when heavy parts are thrown onto the conveyor.

6 Claims, 6 Drawing Figures

AUTOMATIC SLIP COUPLING ASSEMBLY

BACKGROUND OF THE INVENTION

The present invention relates to a coupling for driving a shaft or the like from a power drive, and more particularly, to an automatic slip coupling assembly which automatically disengages a conveyor roller from the power drive in the event of a jam-up of parts transported by the conveyor.

Conveyor system are known which have one or more power driven rollers and a plurality of freely rotatable guiding rollers supporting and guiding the conveyor belt. In a factory or the like, various parts are placed onto the conveyor to be transported to various locations in a plant, and it is common to have jam-ups when the parts are not taken off the conveyor as quickly as they are put onto the conveyor or when the parts become blocked for some reason. The conveyor driving mechanism, conveyor rollers, or the parts themselves may be damaged if the conveyor is continously powered, and it is not stopped when a jam-up occurs. Thus, it is desirable to provide some means for stopping the conveyor when a jam-up or blockage of the items being transported causes a slow-down or stoppage of the conveyor belt.

Manual controls may be used to stop the conveyor when a jam-up occurs, but an operator is required full-time to watch over the conveyor system and to actuate the controls when necessary. This is not desirable because it is an expensive use of personnel who could be used for other jobs. Further, the additional controls required are expensive and are subject to failure.

Typical automatic shut-off devices which may be used to selectively stop a conveyor system, including slip clutches and other mechanisms, are expensive and complex. Because of the enormous number of shut-off devices that are required for existing or new conveyor systems, it is not feasible to utilize existing shut-off devices, and many of the known devices could not be installed or would be extremely expensive to install in existing or new conveyor systems.

Thus, the present invention was devised to provide a simple, coupling assembly for driving a conveyor roller which automatically disengages the conveyor roller from the power drive when the conveyor is jammed or blocked, thereby avoiding the necessity for shutting down the system.

Another problem with existing conveyor systems is that heavy parts such as engine heads, blocks, or the like are thrown onto the conveyor for transportation. Each conveyor roller typically has a core opening through which a mounting shaft passes, and the roller is either fixed to the shaft or secured thereto by rotatable bearings. The conveyor roller is mounted between frame members of the conveyor for free rotation about the axis of its shaft. The conveyor rollers may be damaged and distorted by the impact from the heavy parts thrown onto the conveyor, and damage may also occur to the bearings which may require that the roller or bearings be replaced. Thus, there has been a need for a conveyor roller mounting device which will absorb and substantially withstand the potentially damaging blows received when heavy parts are thrown onto the conveyor.

A new conveyor roller mounting device has also been needed which replaces the bearing assemblies presently being used to rotatably mount the conveyor roller. It is difficult to assemble conveyor rolls because the bearings must be pressed onto the rotatable shaft and also pressed into the cylindrical roll. This is time consuming, and if a bearing becomes damaged, replacement costs are high. Thus, there has been a need for a simple and inexpensive roller mounting device to overcome the disadvantages present in known mounting structures.

An improved roller mounting device is also necessary to assist in the replacement of present roller drives with the automatic slip coupling assembly of the present invention. The coupling assembly provided herein may be connected to the existing conveyor rolls by using the improved roller mounting device. If the drive roll having the present coupling mechanism is impacted by a heavy load, the roller mounting device will aid in withstanding the impact and there is less likelihood that the power roll will have to be removed for repairs. Thus, the roller mounting device of the present invention provides additional advantages to the slip coupling assembly taught herein as well as advantages for mounting conveyor rolls in general.

SUMMARY OF THE INVENTION

In accordance with the present invention, an automatic slip coupling assembly for conveyor rollers is provided which includes an improved roller mounting device. The automatic slip coupling assembly of the present invention automatically disengages the conveyor roller from the power drive to prevent damage in the event of a jam-up of parts transported by the conveyor. The present invention also includes an improved roller mounting device which provides a quick attachment of the roller onto its shaft and absorption of impacts received by the roller.

In a preferred embodiment, the automatic slip coupling assembly includes a plurality of radially spaced apart ball or cylindrical rollers which are rotatably secured in a retainer ring and which are sandwiched between a pair of resilient donut shaped rings. One of the donut shaped resilient rings is mounted in an annular channel of a sprocket hub, and the other resilient ring is mounted in an annular channel of a clutch plate.

The coupling assembly, including the clutch plate, resilient rings, retainer ring with ball rollers, and sprocket hub, is mounted onto the end of a shaft extending from the conveyor roller. The shaft end has a portion which is circular in cross-section for rotatably mounting the sprocket hub and retainer ring inboard, closest to the conveyor roll, and a portion which is non-circular for fixedly mounting the clutch plate outboard of the sprocket hub.

The powered rotative movement of the sprocket is transmitted through the resilient donut-like rings and ball rollers to the clutch plate to drive the drive shaft. If the jam-up occurs, the sprocket unit slips and continues to rotate because of the torque-limiting slip between the ball rollers and the resilient ring mounted to the clutch plate. This prevents damage to the conveyor belt drive mechanism, the conveyor belt, and the parts jammed on the conveyor.

In another form of the automatic slip coupling assembly, the sprocket hub includes an annular groove or cam race, and the clutch plate includes an annular channel for holding an O-ring resilient tube. The ball roller-retainer ring unit is sandwiched between the race of the sprocket hub and the O-ring in the clutch plate. The clutch plate is fixed to the conveyor roll shaft while the sprocket unit is free to rotate on it. If a jam-up of parts on the conveyor occurs, the sprocket unit continues to rotate because of the torque-limiting slip between the ball rollers and the O-ring mounted to the clutch plate.

In still another form of the automatic slip coupling assembly, the sprocket hub includes a hardened metal cam detail or race, and the clutch plate also includes a hardened metal cam detail or race. The ball rollers are sandwiched between the two races, and tension adjustment is provided by a spring and adjustment nut outboard of the clutch plate. The clutch plate is fixed to the shaft extending from the conveyor roll while the sprocket unit is free to rotate on the conveyor roll shaft. If a jam-up or blockage of parts occurs which slows down or stops the conveyor, the sprocket unit continues to rotate without damaging the conveyor roll drive due to the torque-limiting slip between the ball rollers and clutch plate.

The present invention also contemplates an improved roller mounting device which includes a pair of concentric cylindrical shell portions. The inner shell portion is secured onto the shaft passing through the conveyor roll by a friction fit. The outer shell portion forms an interference fit with an open end of the cylindrical roll. The space between the concentric shell portions is filled with a resilient material which adheres to the surfaces of the shells and holds them together as a unit.

The roller mounting device taught herein eliminates the necessity for rotatable bearings which may become damaged when the conveyor roll is impacted by a heavy load. The resilient material between the concentric shells yields on impact to prevent damage to the conveyor roll. The mounting device also provides a quick, simple, and inexpensive method of mounting the conveyor roll to its rotative shaft.

The automatic slip coupling assembly and roller mounting device of the present invention provide several advantages and features. The coupling assembly automatically disengages the conveyor roll from the power drive in the event of a jam-up of parts transported by the conveyor. It eliminates the need for manual controls or other shut-off devices which are expensive and complex. The roller mounting device absorbs and withstands the potentially damaging blows received by the conveyor roller when heavy parts are thrown onto it. It also replaces the costly bearing assemblies presently used to rotatably mount the roller to its shaft. A further advantage of the mounting device is that it provides a quick connection between the automatic slip coupling assembly of the present invention and an existing conveyor roll.

Other advantages and meritorious features of the automatic slip coupling assembly including the improved roller mounting device will be more fully understood from the following description of the preferred embodiments, the appended claims, and the drawings, a brief description of which follows.

DESCRIPTION OF THE INVENTION

Figure 1:
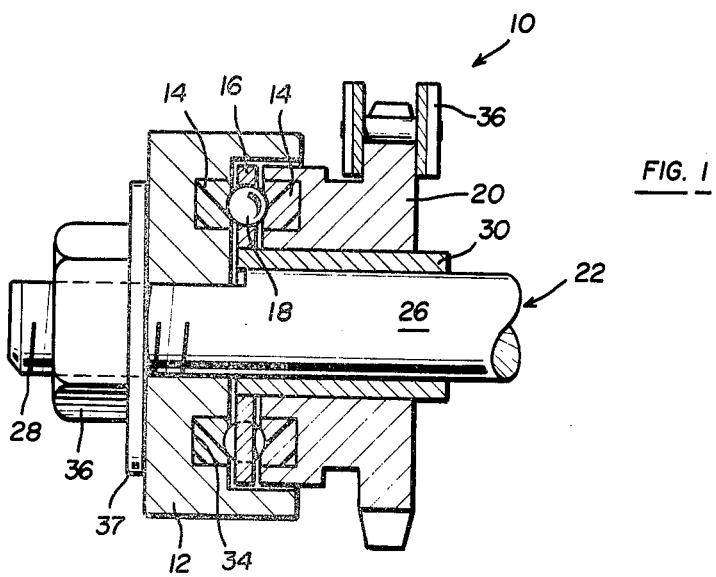
FIG. 1 is a cross-sectional side view of the preferred automatic slip coupling assembly of the present invention.
Figure 2:
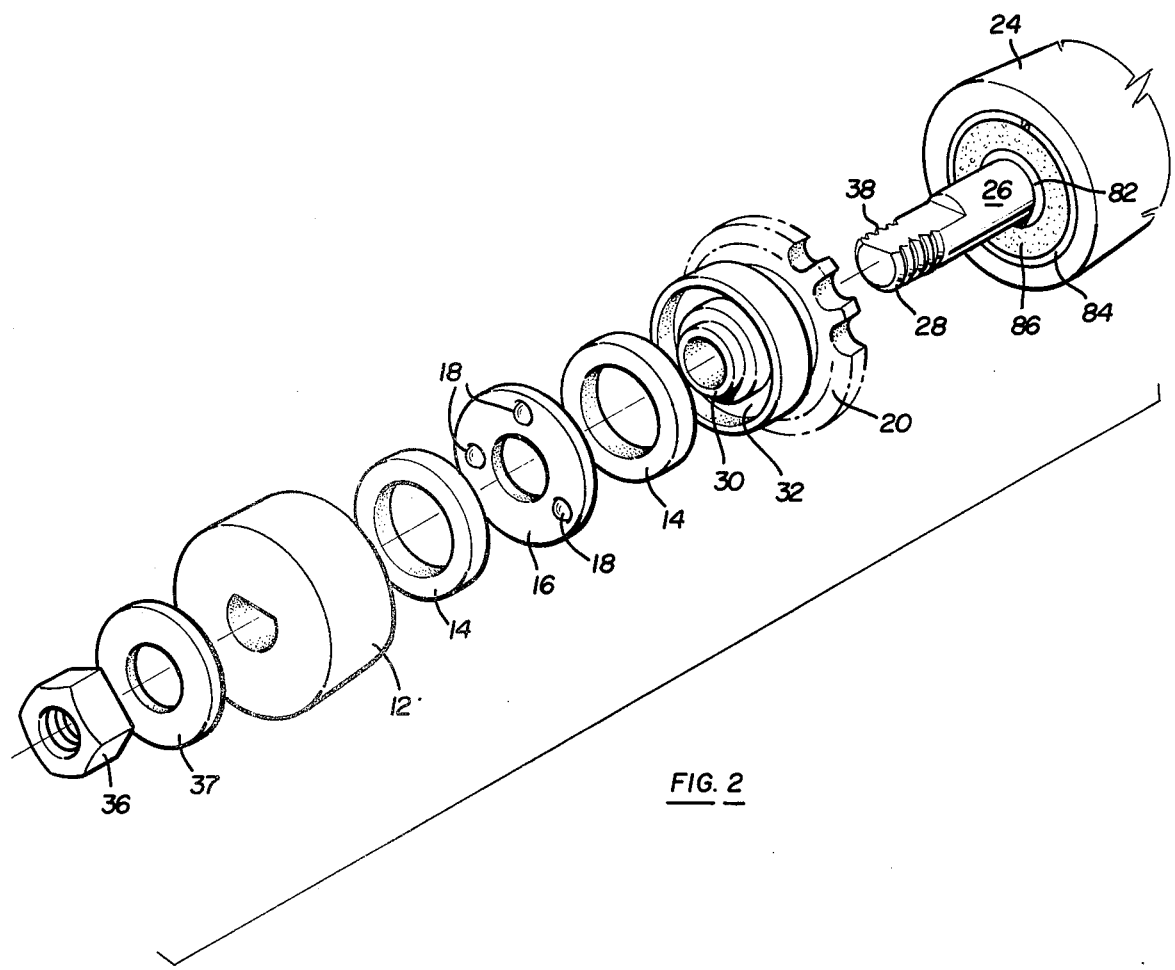
FIG. 2 is a perspective assembly view illustrating the assembly of the component parts shown in FIG. 1.

Referring to FIGS. 1 and 2, the automatic slip coupling assembly 10 of the present invention includes a clutch plate 12, resilient donut-shaped rings 14, a retainer ring 16 having ball rollers 18, and a sprocket hub 20. The sprocket hub 20 and retainer ring 16 are rotatably mounted onto the end of a shaft 22 extending from a conveyor roller 24 (FIG. 2). The present invention is disclosed in a conveyor system but is adaptable for use in any system where a torque-limiting coupling mechanism is desirable for coupling a power drive to a shaft.

The conveyor roller shaft 22 includes a portion 26 which is circular in cross-section and a portion 28 which is non-circular in cross-section for fixedly mounting the clutch plate 12 outboard of the sprocket hub 20. The sprocket hub 20 and retainer ring 16 are rotatably mounted on circular shaft portion 26 by bushing 30.

One of the donut shaped resilient rings 14 is mounted in an annular channel 32 of sprocket hub 20, and the other resilient ring 14 is mounted in an annular channel 34 of clutch plate 12. The ball rollers 18 are rotatably secured to retainer ring 16 at spaced apart radial positions. When the slip coupling assembly 10 is assembled, the ball rollers 18 are compressed by and sandwiched between the resilient rings 14. While the ball rollers 18 are illustrated as being spherical, cylindrical rollers are also within the scope of the present invention.

The slip coupling assembly 10 is powered for rotative movement by a chain 36 which is entrained around the outer periphery of sprocket 20. A motor (not shown) drives chain 36 which in turn rotates sprocket member 20. The powered rotative movement of the sprocket is transmitted through the resilient donut-like rings 14 and ball rollers 18 to the clutch plate 12 which drives the conveyor roller. If a jam-up of parts on the conveyor occurs, the sprocket hub 20 and retainer ring 16 continue to rotate on shaft portion 26, but clutch plate 12 does not rotate. Thus, damage to the conveyor or parts on the conveyor is prevented because of the slip that occurs between the ball roller 18 and the resilient ring 14 mounted to the clutch plate 12.

The coupling assembly of the present invention is operable when being driven either clockwise or counter-clockwise, and it is adjustable for varying loads and operating conditions. The assembly provides smooth torque-limiting slippage in either direction of rotation.

Figure 5:
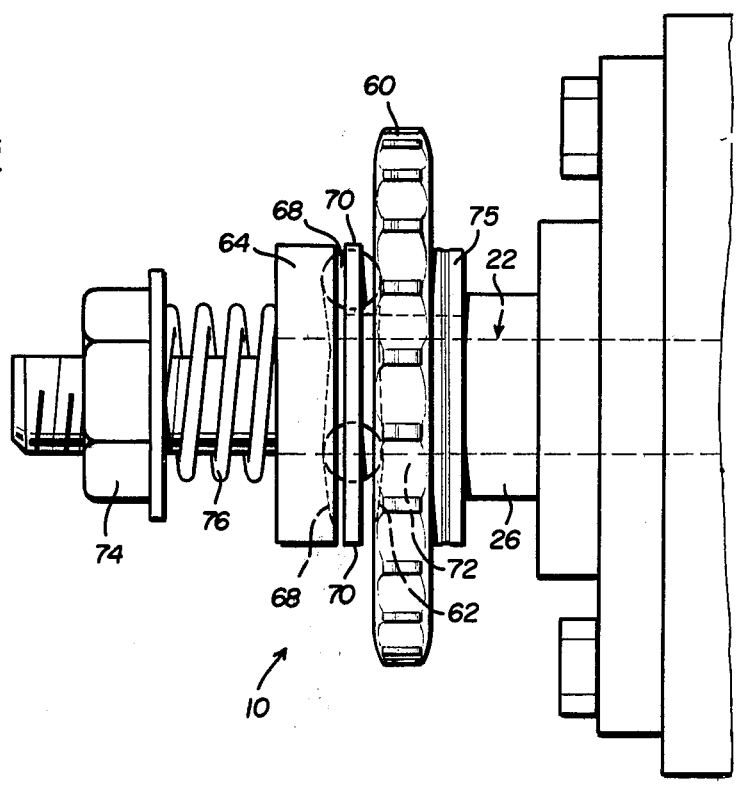
FIG. 5 is a side elevational view of another embodiment of the automatic slip coupling assembly.

The assembled slip coupling assembly 10 is held on conveyor roll shaft 22 by nut 36 and washer 37 secured to the threaded end 38 of shaft 22. The tightening of nut 36 pre-sets the amount of torque that can be applied to sprocket 20 before slippage occurs between the sprocket and clutch plate 12. A spring biasing adjustment, such as illustrated in FIG. 5, may also be used to preset the torque limit of the assembly.

The automatic slip coupling assembly 10 of the present invention automatically disengages the conveyor roll 24 from the power drive 36 to prevent damage in the event of a jam-up of the parts being transported by the conveyor. The donut-shaped resilient members 14 may be made of urethane or similar materials. In a like manner, the opposed resilient members 14 may be shaped as O-rings which are either solid or resilient tubing.

Figure 3:
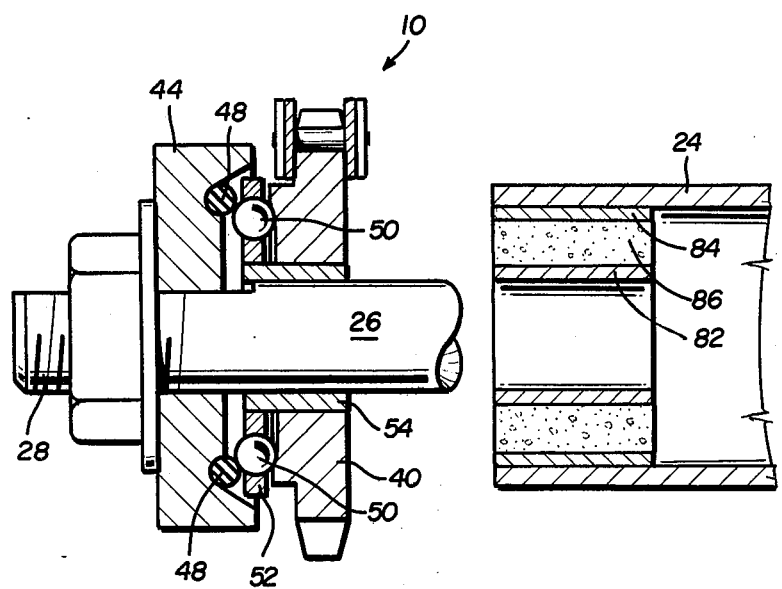
FIG. 3 is a cross-sectional side view of a second embodiment of the automatic slip coupling assembly.
Figure 4:
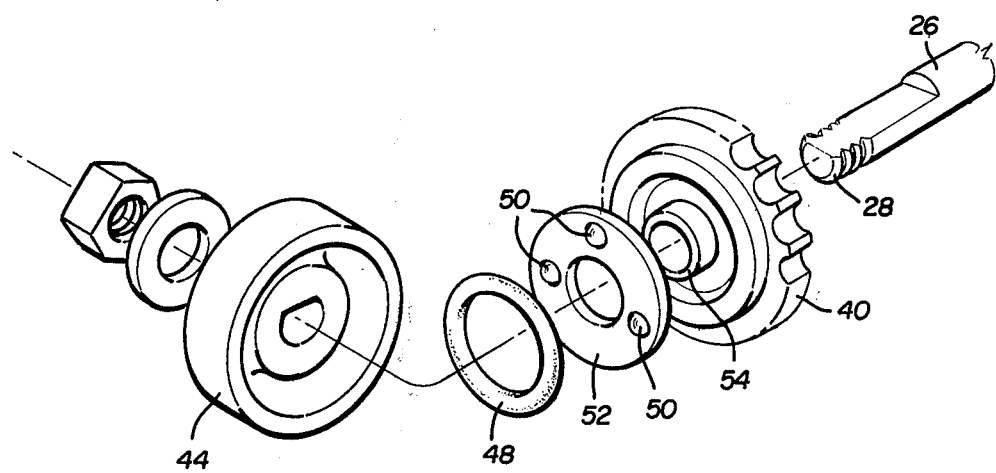
FIG. 4 is a perspective assembly view illustrating the assembly of the component parts shown in FIG. 3.

Referring to FIGS. 3 and 4, another form of the automatic slip coupling assembly 10 is illustrated. The sprocket hub 40 includes a groove or cam race 42, and the clutch plate 44 includes an annular channel 46 (FIG. 4) for holding an O-ring resilient tube 48. Ball rollers 50, which may be spherical or cylindrical, are rotatably secured to retainer ring 52 at spaced apart radial positions, and the ball rollers are sandwiched between race 42 of sprocket hub 40 and O-ring 48.

The sprocket hub 40 is rotatably mounted on the circular shaft portion 26 by bushing 54, as previously described, and the clutch plate 44 is fixed to the non-circular portion 28 of shaft 22. The powered rotative movement to sprocket 40 is transmitted through ball rollers 50 and O-ring 48 to clutch plate 44 which drives the conveyor roll 24. If a jam-up or blockage of the parts on the conveyor occurs, the sprocket 40 continues to rotate and torque limiting slip occurs between the ball rollers 50 and O-ring 48 which disengages clutch plate 44. This prevents damage to the conveyor belt drive mechanism, the conveyor belt, and the jammed parts on the conveyor because the coupling assembly automatically disengages the conveyor roller 24 from the power drive 40 in the event of a jam-up.

Another form of the slip coupling assembly 10 of the present invention is illustrated in FIG. 5. The sprocket hub 60 includes a hardened metal cam detail 62, and the clutch plate 64 includes a cam detail 66. The ball rollers 68 are rotatably mounted in retainer plate 70 at radially spaced apart locations. The ball rollers 68 are compressed by and sandwiched between the hardened metal cam details 62 and 66.

The entire slip coupling assembly 10 illustrated in FIG. 5 is mounted on shaft 22 which extends from conveyor roll 24. The sprocket hub 60, retainer ring 70, and thrust bearing 75 are rotatably mounted on the circular shaft portion 26 by bushing 72. The clutch plate 64 is fixedly mounted to the non-circular shaft portion 28, and clutch plate 64 is adjustably spring biased against ball rollers 68 by adjustment nut 74 and spring 76.

The spring adjustment 74, 76 may be used on any one of the embodiments illustrated to control the amount of torque that may be applied to the sprocket before torque-limiting slippage occurs between the sprocket and clutch plate. The resilient rings 14 and 48 may also be tightened or squeezed against their respective ball rollers to control the amount of torque that the coupling assembly will accept before slippage occurs between the sprocket and clutch plate.

The powered rotative movement of the sprocket 60 is transmitted through the ball rollers 68 to the clutch plate 64 which drives the conveyor roll 24. If a jam-up or blockage occurs, the sprocket unit 60 and retainer plate 70 continue to rotate while the ball rollers 68 slip or rotate in clutch plate cam detail 66 to disengage the conveyor roll from the power drive thereby preventing damage.

Figure 6:
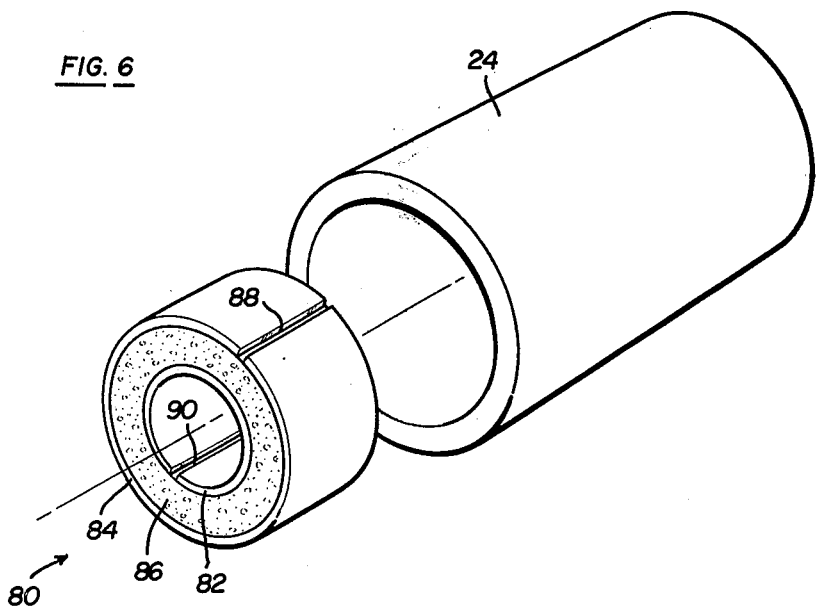
FIG. 6 is a perspective illustration of the improved roller mounting device taught by the present invention.

The present invention also includes an improved roller mounting device 80 illustrated in FIG. 6. The roller mounting device 80 includes concentric cylindrical shell portions 82 and 84. The space between the cylindrical shell portions 82 and 84 is filled with a resilient material 86 or similar material which adheres to the surfaces of the shells and forms a unitary assembly. The roller mounting device 80 is force fitted into the open end of conveyor roll 24, and in a like manner shaft 22 is force fitted through inner cylindrical shell 82. The outer shell portion 84 is slotted at 88 and the inner shell 82 is slotted at 90 to facilitate installation. After the mounting device 80 has been force-fitted into the open end of roll 24, the resilient material 86 returns the shells to substantially their original dimension which insures a continuous and solid fit between device 80 and roll 24.

The roller mounting device 80 absorbs and withstands the potentially damaging blows received when heavy parts are thrown onto the conveyor. It also replaces the costly rotatable bearings presently being used to rotatably mount conveyor rolls. If the conveyor drive roll 24, having the slip coupling assembly 10 of the present invention, is impacted by a heavy load, the roller mounting device 80 will absorb the impact, and there is less likelihood that the power roll will have to be removed for repairs. Thus, the roller mounting device of the present invention provides additional advantages to the coupling assembly 10 taught herein as well as advantages for mounting conveyor rolls in general.

It will be apparent to those skilled in the art that the foregoing disclosure is exemplary in nature rather than limiting, the invention being limited only by the appended claims.

We claim:

1. A slip coupling assembly for coupling drive means to a tubular means, said tubular means including a driving shaft extending therefrom, said coupling assembly comprising:

sprocket means being freely rotatably mounted to said driving shaft of said tubular means, said sprocket means including a resilient portion, said drive means being connected to said sprocket means;

clutch plate means being fixedly mounted to said driving shaft of said tubular means, said clutch plate means including a resilient portion;

said resilient portions of said clutch plate means and said sprocket means being donut-shaped resilient rings, one of said donut-shaped resilient rings being mounted in an annular channel of said sprocket means and the other donut-shaped resilient ring being mounted in an annular channel of said clutch plate means;

a plurality of rollers being mounted to a retainer ring, said rollers and retainer ring being sandwiched between said clutch plate means and said sprocket means, and said rollers being sandwiched between said resilient portions of said clutch plate means and said sprocket means;

said sprocket means being powered for rotative movement by said drive means, and the powered rotative movement of said sprocket means being transmitted through said resilient portions and said rollers to said clutch plate means whereby said tubular means being driven; and said tubular means being capable of disengagement from said drive means whereby said sprocket means continues to be rotated by said drive means and said clutch plate means being stopped from rotation due to torque-limiting slip which occurs between said rollers and said resilient portions.

2. The coupling assembly as defined in claim 1 wherein said driving shaft includes a first portion which is substantially circular in cross-section for freely rotatably mounting said sprocket means and a second portion which is non-circular in cross-section for fixedly mounting said clutch plate means.

3. The coupling assembly as defined in claim 1 wherein said coupling assembly is secured on said driving shaft by adjustable means, said adjustable means pre-setting the amount of torque that may be applied to said sprocket means before torque-limiting slippage occurs between said sprocket means and said clutch plate means.

4. The coupling assembly as defined in claim 1 wherein said rollers are rotatably mounted to said retainer ring at spaced-apart radial positions.

5. The coupling assembly as defined in claim 1 wherein said donut-shaped resilient rings are made of urethane.

6. The coupling assembly as defined in claim 1 wherein said tubular means and said driving shaft are secured together by a mounting device, said mounting device comprising a pair of concentric cylindrically shaped outer and inner shell portions, the space between the outer periphery of the inner shell and the inner periphery of the outer shell being filled with a resilient material which bonds to the surfaces of said shells and holds them together as a unit, said driving shaft being force-fitted through said inner cylindrical shell, and said outer cylindrical shell being force-fitted into an open end of said tubular means.

* * * * *